US006685286B2

(12) United States Patent
Chen et al.

(10) Patent No.: US 6,685,286 B2
(45) Date of Patent: Feb. 3, 2004

(54) COMPUTER ENCLOSURE INCORPORATING DRIVE BRACKETS

(75) Inventors: Yun Lung Chen, Taipei (TW); Yu Tai Liu, Taipei (TW); Jung Chi Chen, Taipei (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/990,984

(22) Filed: Nov. 14, 2001

(65) Prior Publication Data

US 2003/0090180 A1 May 15, 2003

(51) Int. Cl.[7] ............................................. A47B 81/06
(52) U.S. Cl. ..................................... 312/223.2; 361/685
(58) Field of Search ........................... 312/223.1, 223.2; 351/685, 727, 684

(56) References Cited

U.S. PATENT DOCUMENTS 5,447,367 A * 9/1995 Wei .......................... 312/223.2
6,018,457 A * 1/2000 Mroz ........................... 361/685
6,030,062 A * 2/2000 Chen et al. ................ 312/223.2
6,137,678 A * 10/2000 Gebara et al. ............... 361/685
6,437,977 B1 * 8/2002 Yu ............................... 361/685

\* cited by examiner

Primary Examiner—Lanna Mai
Assistant Examiner—Jerry A. Anderson
(74) Attorney, Agent, or Firm—Wei Te Chung

(57) ABSTRACT

A computer enclosure includes a cage (10), a small drive bracket (30), and a cover (80). The cage includes a front panel (12) and a side panel (14). The front panel is rearwardly stamped to integrally form a vertical plate (122) opposing the side panel. The vertical plate and the side panel each form two locking members (132, 142). The small drive bracket includes two flanges (40, 46), each defining two locking cutouts (42, 48). A horizontal plate (60) is secured on the small drive bracket. The combined small drive bracket and horizontal plate is attached within the cage, with the locking members engaging in the corresponding locking cutouts. The horizontal plate is connected between a bottom portion of the vertical plate and the side panel. The combined vertical plate, side panel and horizontal plate cooperatively constitute a large drive bracket (70). The cover is attached to the cage.

10 Claims, 3 Drawing Sheets

COMPUTER ENCLOSURE INCORPORATING DRIVE BRACKETS

BACKGROUND OF THE INVENTION

1. Field of the Invention

The present invention relates to computer enclosures, and particularly to computer enclosures incorporating drive brackets integrally formed with the enclosures.

2. Related Art

Various data storage devices are installed in computers for communication and handling of data. Drive brackets are often used to secure such data storage devices inside the computers.

In a conventional computer, drive brackets are typically formed separately from a computer enclosure. U.S. Pat. No. 5,564,804 discloses a conventional drive bracket for accommodating a data storage device. The data storage device is firstly secured within the drive bracket. The combined drive bracket and data storage device is then slid into a housing of a computer enclosure. U.S. Pat. No. 6,273,273 discloses another conventional drive bracket for accommodating a data storage device. The data storage device is firstly attached to the drive bracket. The combined drive bracket and data storage device is then pivotally attached to a cage of a computer enclosure.

However, in the above-described patent disclosures, the drive brackets are produced separately from the housing and the cage. Production of the drive brackets requires extra material, thereby unduly inflating costs. Moreover, production and assembly of the corresponding computer enclosures is unduly complicated and time-consuming.

SUMMARY OF THE INVENTION

Accordingly, an object of the present invention is to provide a computer enclosure which has a large and small drive bracket in which the large drive bracket is integrally formed with the computer enclosure.

To achieve the above-mentioned object, a computer enclosure in accordance with the present invention comprises a cage, a small drive bracket, and a cover. The cage comprises a front panel and a side panel. The front panel is rearwardly stamped to integrally form a vertical plate opposing the side panel. The vertical plate and the side panel each form a pair of locking members. The small drive bracket comprises a pair of side walls. Each side wall has a horizontal shoulder formed on a top portion thereon. A flange extends perpendicularly from a free edge of each shoulder. Each flange defines a pair of locking cutouts. A horizontal plate is secured on the shoulders. The combined small drive bracket and horizontal plate is attached within the cage, with the locking members of the cage engaging in the locking cutouts of the small drive bracket. The horizontal plate is connected between a bottom portion of the vertical plate and the side panel. The combined vertical plate, side panel and horizontal plate cooperatively constitute a large drive bracket. The cover is attached to the cage and covers both the large and small drive brackets.

Other objects, advantages and novel features of the present invention will be drawn from the following detailed description of preferred embodiment of the present invention with attached drawings, in which:

DESCRIPTION OF THE PREFERRED EMBODIMENT

Figure 1:
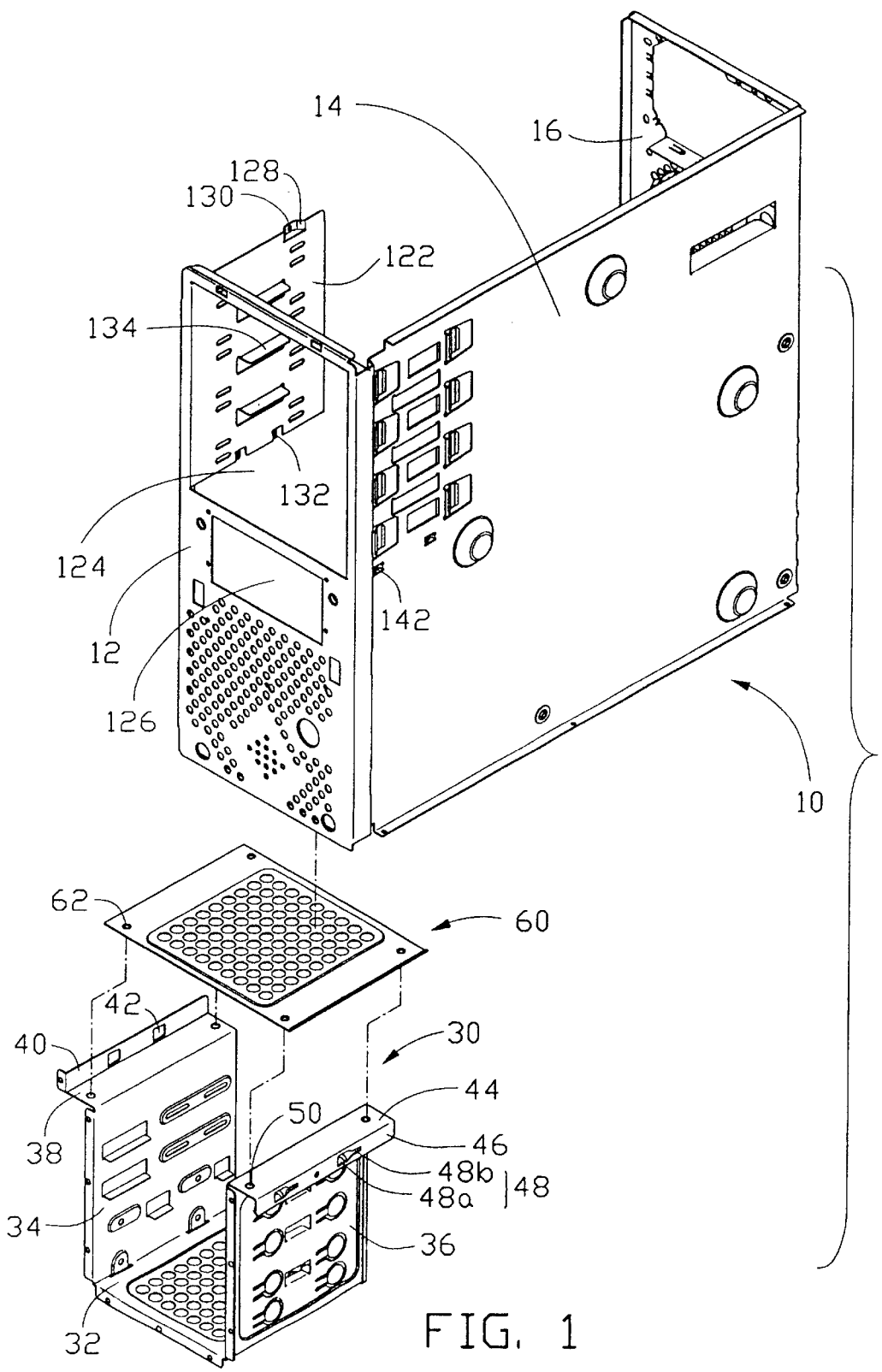
FIG. 1 is an exploded view of a cage, a small drive bracket and a horizontal plate of a computer enclosure in accordance with the present invention.
Figure 2:
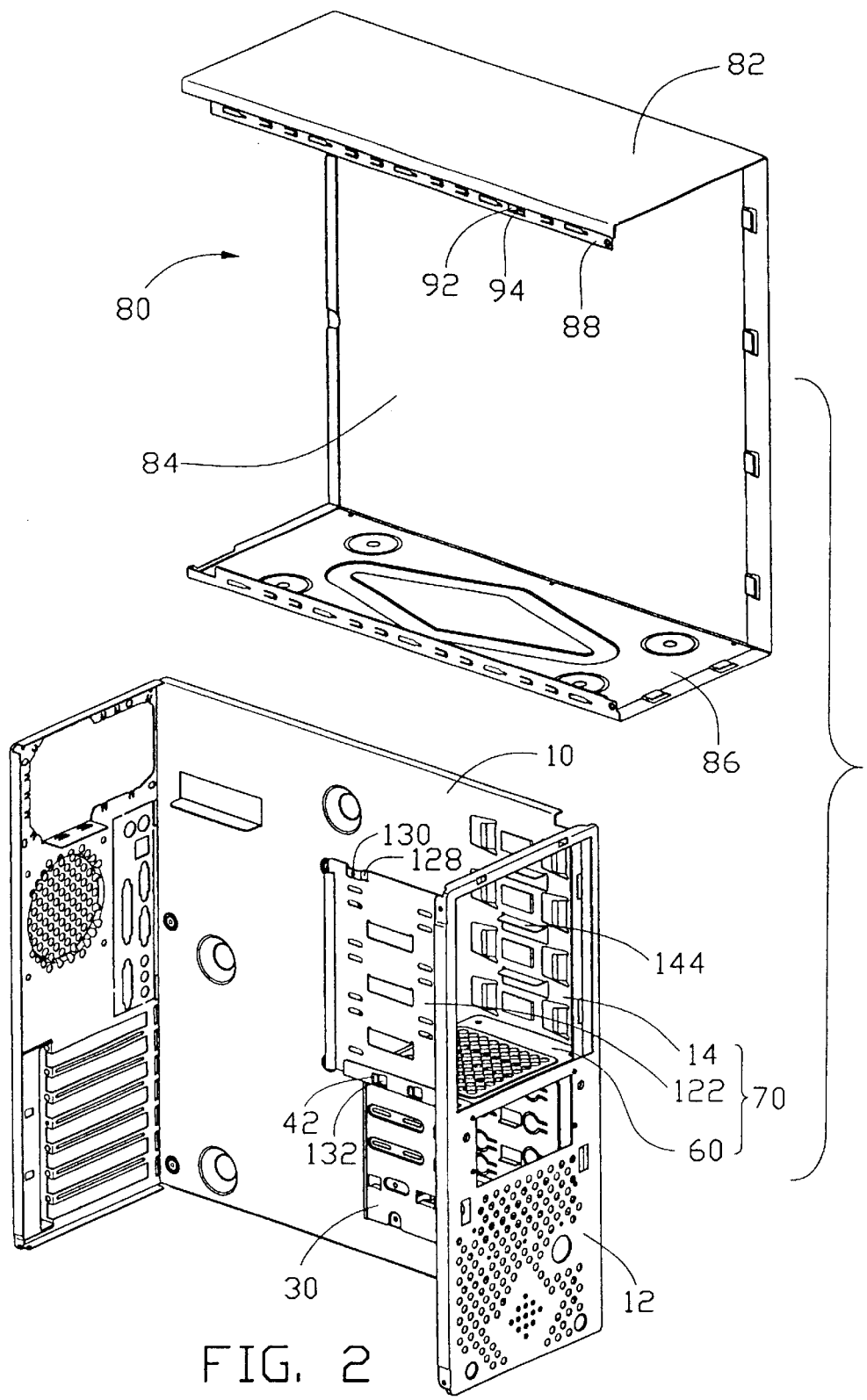
FIG. 2 is an exploded view of a cover of a computer enclosure in accordance with the present invention, together with the components of FIG. 1 now assembled together.

Referring to FIGS. 1 and 2, a computer enclosure in accordance with the present invention comprises a cage 10, a small drive bracket 30, a horizontal plate 60, and a cover 80.

Referring particularly to FIG. 1, the cage 10 comprises a front panel 12, a side panel 14 and a rear panel 16. An upper portion of the front panel 12 is rearwardly stamped to form a rectangular vertical plate 122. The vertical plate 122 is perpendicular to the front panel 12, and opposite to the side panel 14. A large rectangular opening 124 is therefore defined in the upper portion of the front panel 12, for insertion of data storage devices (not shown) therethrough. A small opening 126 is defined in the front panel 12 below the large opening 124, for insertion of data storage devices (not shown) therethrough. A top portion of the vertical plate 122 is outwardly stamped to form a retaining protrusion 128. A screw hole 130 is defined in the retaining protrusion 128. A pair of lockings tabs 132 is formed in a bottom portion of the vertical plate 122. A middle portion of the vertical plate 122 is inwardly stamped to form a plurality of first supporting tabs 134. The first supporting tabs 134 are located generally between the retaining protrusion 128 and the locking tabs 132. The side panel 14 is stamped inwardly to form a pair of locking protrusions 142. A distance between the locking protrusions 142 and a bottom extremity of the cage 10 is less than a distance between the locking tabs 132 and the bottom extremity of the cage 10. The side panel 14 is inwardly stamped to form a plurality of second supporting tabs 144 (see FIG. 2), respectively corresponding to the first supporting tabs 134.

The small drive bracket 30 is generally U-shaped, and comprises a bottom wall 32, a first side wall 34 and a second side wall 36. A first horizontal shoulder 38 extends outwardly from a top edge of the first side wall 34. A first flange 40 extends perpendicularly upwardly from a longitudinal free edge of the first shoulder 38. The first flange 40 is parallel to the first side wall 34. A pair of first locking cutouts 42 is defined in the first flange 22, corresponding to the locking tabs 132 of the cage 10. A second horizontal shoulder 44 extends outwardly from a top edge of the second side wall 36. A second flange 46 depends from a longitudinal free edge of the second shoulder 44. A pair of second locking cutouts 48 is defined in the second flange 46, corresponding to the locking protrusions 142 of the cage 10. Each locking cutout 48 comprises a large entering portion 48a and a small locking portion 48b. A pair of screw apertures 50 is defined in each of the first and second shoulders 38, 44. The horizontal plate 60 is for attaching to the small drive bracket 30. A pair of spaced through apertures 62 is defined near each of opposite edges of the horizontal plate 60, corresponding to the screw holes 50 of the small drive bracket 30.

Referring particularly to FIG. 2, the cover 80 comprises a top plate 82, a side plate 84 and a bottom plate 86. A rim 88 depends from the top plate 82 adjacent a free edge of the top plate 82. A forward portion of the rim 88 is inwardly stamped to form a recessed portion 92, corresponding to the retaining protrusion 128 of the cage 10. A through hole 94 is defined in the recessed portion 92.

In pre-assembly, the horizontal plate 60 is secured on the small drive bracket 30. Two pairs of screws (not shown) are respectively extended through the through apertures 62 of the horizontal plate 60 to engage in the screw apertures 50 of the small drive bracket 30. The combined small drive bracket 30 and horizontal plate 60 is then attached to the cage 10 below the vertical plate 122. The small drive bracket 30 is secured to the front panel 12 by conventional means. The locking tabs 132 of the cage 10 engage with the small drive bracket 30 in the corresponding first locking cutouts 42. The locking protrusions 142 of the cage 10 extend through the entering portions 48a of the corresponding second locking cutouts 48 to engage in the locking portions 48b. The horizontal plate 60 is thus connected between the bottom portion of the vertical plate 122 and the side panel 14. The combined vertical plate 122, side panel 14 and horizontal plate 60 cooperatively constitute a large drive bracket 70.

Figure 3:
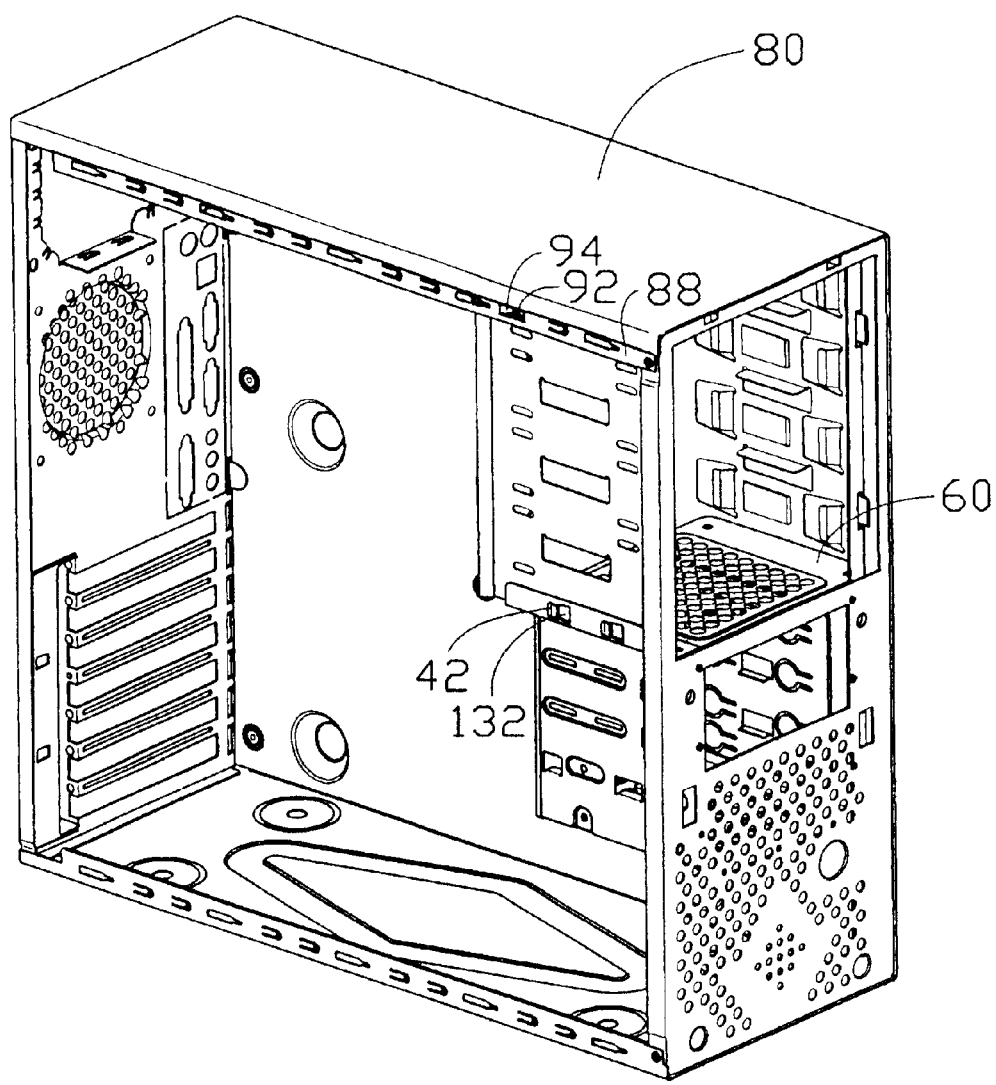
FIG. 3 is an assembled view of FIG. 2.

Referring to FIG. 3, in assembly, the cover 80 is attached to the cage 10 by conventional means. The side plate 84 of the cover 80 abuts against the side panel 14 of the cage 10. The top and bottom plates 82, 84 are connected between the front and rear panels 12, 16 of the cage 10. The recessed portion 92 of the rim 88 abuts the retaining protrusion 128. A screw (not shown) is extended through the through hole 94 of the rim 88 to engage in the screw hole 130 of the vertical plate 122. The computer enclosure is thus completely assembled.

In the present invention, the large drive bracket 70 comprises the vertical plate 122 stamped from the front panel 12 of the cage 10, the side panel 14 and the bottom plate 60. Thus most of the large drive bracket 70 is integrally formed from the cage 10. Only the bottom plate 60 is not integrally formed from the cage 10. The large drive bracket 70 requires relatively few materials to produce, thereby reducing costs. In addition, production and assembly of the computer enclosure is simplified, thereby improving efficiency.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A computer enclosure comprising:
 a cage comprising a front panel and a side panel, a large bracket integrally formed with the cage, the front panel being rearwardly stamped to integrally form a first plate opposing the side panel, the large bracket comprising the first plate and the side panel;
 a small bracket attached to the cage; and
 a cover attached to the cage, the cover comprising a top plate engaging with the first plate, and a side plate abutting the side panel, wherein
  the first plate is stamped outwardly to form a retaining protrusion, the top plate is stamped inwardly to form a recessed portion abutting the retaining protrusion, and a screw is extended through the recessed portion to engage with the retaining protrusion.

2. The computer enclosure as claimed in claim 1, wherein the first plate and the side panel respectively form a plurality of supporting tabs for supporting data storage devices thereon.

3. The computer enclosure as claimed in claim 1, wherein the small bracket comprises a pair of side walls, each side wall has a shoulder on a top portion thereof, a second is secured on the shoulders, and the second plate covers the small bracket.

4. The computer enclosure as claimed in claim 3, wherein a pair of flanges respectively extends perpendicularly from longitudinal free edges of the shoulders, each flange defines a locking cutout, and the first plate and the side panel each forms a locking member engaging in a corresponding locking cutout.

5. The computer enclosure as claimed in claim 4, wherein one of the flanges extends upwardly from one of the shoulders and the other flange depends from the other shoulder.

6. The computer enclosure as claimed in claim 4, wherein one of the locking cutouts comprises a large entering portion and a small locking portion, and a locking member engaged in said one of the locking cutouts is a locking protrusion.

7. A computer enclosure comprising:
 a cage comprising a front panel and a side panel, a first plate integrally formed with the front panel and opposing the side panel, the first plate and the side panel cooperatively constituting a large bracket;
 a small bracket attached to the cage, the small bracket comprising a pair side walls each having a shoulder on a top portion thereof, a second plate being secured on the shoulders and covering the small bracket; and
 a cover attached to the cage, wherein
  a pair of flanges respectively extends perpendicularly from longitudinal free edges of the shoulders, each flange defines a locking cutout, and the first plate and the side panel each forms a locking member engaging in a corresponding locking cutout.

8. A computer enclosure comprising:
 a cage comprising a front panel and a side panel perpendicular to said front panel;
 a vertical plate integrally extending rearwardly from a side edge of an opening in the front panel and parallel to said side panel;
 said vertical plate cooperating with said side panel to define a first drive bracket; and
 a second drive bracket being discrete from said front panel and said side panel and located in vertical alignment with said first drive bracket; wherein
  a first space defined in said first drive bracket and a second space defined in said second drive bracket are isolated from each other via a horizontal plate provided by said second drive bracket.

9. A computer enclosure comprising:
 a cage having a front panel and a side panel, a vertical plate integrally formed with the front panel and opposing the side panel to form a large drive bracket;
 a small drive bracket attached within the cage and engaged with the large bracket, the small drive bracket comprising a pair of side walls, each of the side walls having a shoulder on a top portion thereof, a pair of flanges respectively extending perpendicularly from longitudinal free edges of the shoulders and engaging with the vertical plate and the side panel respectively;
 a horizontal plate secured on the small bracket, wherein the vertical plate, side panel and horizontal plate cooperatively constitute a large bracket adapted for receiving at least one storage device therein; and
 a cover fixed to the cage.

10. The computer enclosure as claimed in claim 9, wherein the vertical plate and the side panel are respectively stamped inwardly to form supporting tabs for supporting the at least one storage device thereon.

* * * * *